D. L. CROSBIE.
RESILIENT WHEEL.
APPLICATION FILED JAN. 16, 1911. RENEWED OCT. 24, 1911.
1,023,416.
Patented Apr. 16, 1912.
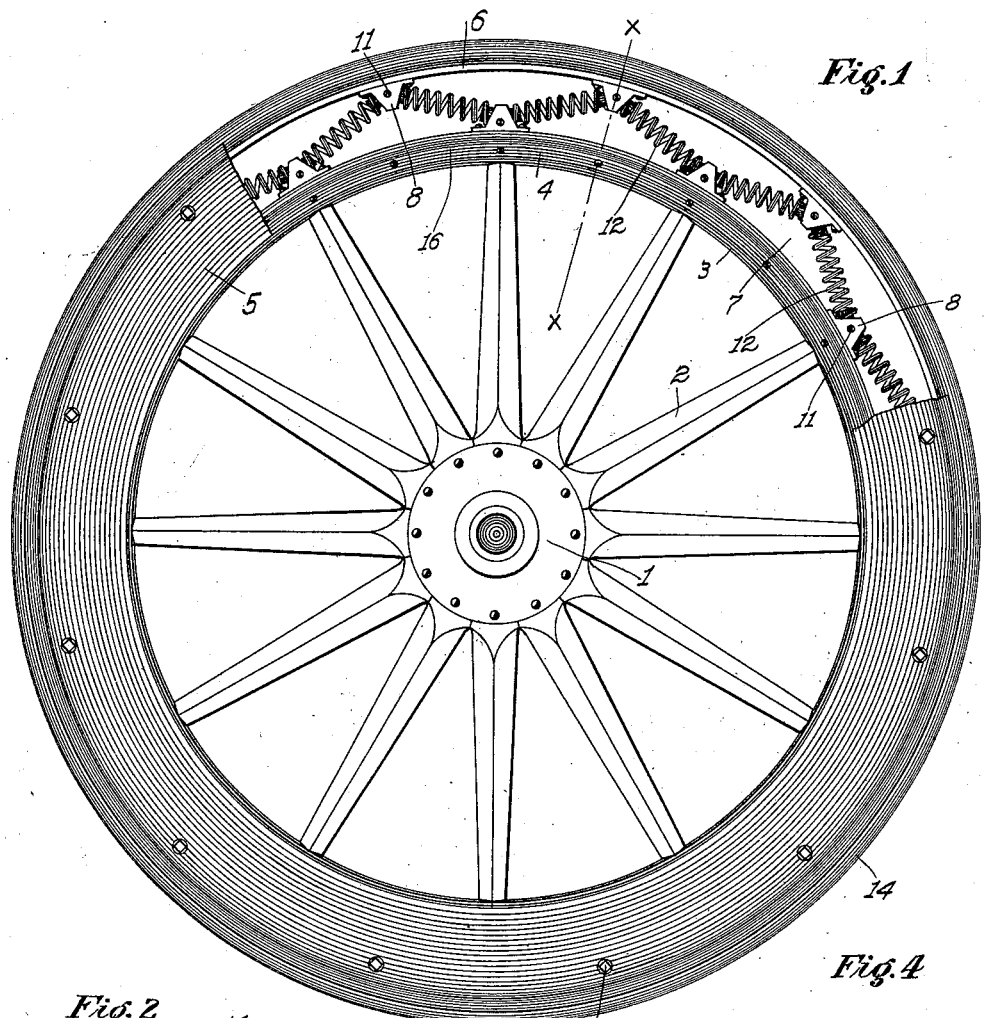
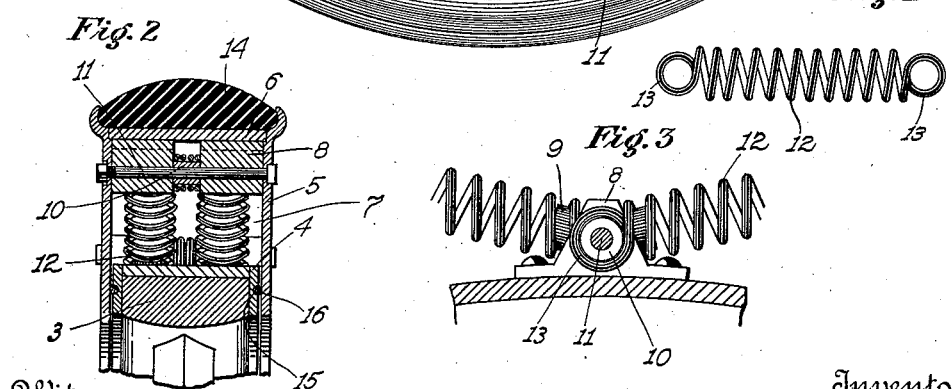

UNITED STATES PATENT OFFICE.

DANIEL L. CROSBIE, OF SACRAMENTO, CALIFORNIA, ASSIGNOR OF ONE-THIRD TO JOSEPH D. CORNELL AND VICTOR J. BARTELS, BOTH OF SACRAMENTO, CALIFORNIA.

RESILIENT WHEEL.

1,023,416.

Specification of Letters Patent.

Patented Apr. 16, 1912.

Application filed January 16, 1911, Serial No. 602,828. Renewed October 24, 1911. Serial No. 656,485.

*To all whom it may concern:*

Be it known that I, DANIEL L. CROSBIE, a citizen of the United States, residing at Sacramento, in the county of Sacramento, State of California, have invented certain new and useful Improvements in Resilient Wheels; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in vehicle wheels, and particularly it is the object of the invention to produce a resilient spring wheel which will supplant the pneumatic tire wheel now in use and at the same time give the same cushion and resilient effect as does such pneumatic wheel when the same encounters rough or uneven roads.

A further object of the invention is to produce a simple and inexpensive device and yet one which will be exceedingly effective for the purposes for which it is designed.

These objects I accomplish by means of such structure and relative arrangement of parts as will fully appear by a perusal of the following specifications and claim.

In the drawings similar characters of reference indicate corresponding parts in the several views.

Figure 1 is a side elevation partly broken out showing my complete wheel. Fig. 2 is a sectional view taken on a line x—x of Fig. 1. Fig. 3 is a fragmentary view showing a means of attaching springs. Fig. 4 is a side elevation of a spring.

Referring now more particularly to the characters of reference on the drawings, 1 designates the hub of a wheel, 2 the spokes thereof and 3 the rim or felly. In applying my improved structure I first provide a channeled iron tire 4 for said felly or rim 3 and over this are slidable side members 5 of an auxiliary tire 6, there being a space 7 intermediate said members 4 and 6. Bolted to the members 4 and 6 and disposed in alternate order with respect to each other are upwardly projecting flanges having a plurality of projecting pins or lugs 9 on each side. The members 8 are formed of two parts and disposed in between each of said two parts is a sleeve or pin 10, the whole being joined together by a cross bolt 11 projecting through the sides 5 and the members 8 and 10, which bolts hold together the members 8 and 10 and incidentally join the side members 5 to the rim 6.

Interposed between each of the flanges 8 on the member 4 and the corresponding flanges 8 on the member 6 are springs 12 which springs project over the pins 9 and have projecting ends 13 extending around the sleeves 10 which holds them in fixed position. As will be noticed from the drawing in Fig. 1, these springs 12 project alternately from connection with the member 4 and the member 6 and from connection with the member 6 and the member 4, and thus when any weight is brought upon the wheel it causes all of said springs to push one against the other and with any rotary motion of the wheel all of said springs act to push one against the other and thus compensate for any undue pulling strain which may be placed upon them by said rotary motion, and hence they will not pull loose from their moorings with the rotary motion of the wheel under power, and hence they will give the necessary resiliency as is desired and still permit of proper traction and rotary motion such as they will be subjected to in operation.

The side members 5 may carry, if desired, a solid rubber outer rim 14. The outer sides of the member 4 are curved as at 15 and carry a washer 16 of felt or other suitable material to keep out dust and dirt.

From the foregoing description it will readily appear that I have produced such a device as will give the necessary resiliency in operation and thus produce the same results as will a pneumatic wheel, thus fulfilling the objects of the invention as set forth herein.

While this specification sets forth in detail the present and preferred construction of the device, still in practice such deviations from such detail may be resorted to as do not form a departure from the spirit of the invention.

Having thus described my invention, what I claim as new and useful and desire to secure by Letters Patent is:

A resilient wheel comprising a wheel having a hub, spokes and felly, a tire attached to said felly, an auxiliary tire spaced from said first named tire and having side members slidable over said first named tire, projecting flanges on said first named tire and said auxiliary tire, those flanges on said first named tire being disposed in alternate order with respect to those on said auxiliary tire, each of said flanges being formed of two members spaced apart, a member of smaller diameter than said flanges disposed between each set of said flanges, projecting lugs on each side of said flanges, springs interposed between said flanges and fitting over said lugs, and curved ends on said springs disposed around said smaller members between said flanges, as described.

In testimony whereof I affix my signature in presence of two witnesses.

DANIEL L. CROSBIE.

Witnesses:
  PERCY S. WEBSTER,
  FRANK H. CARTER.

Copies of this patent may be obtained for five cents each, by addressing the "Commissioner of Patents, Washington, D. C."